Feb. 28, 1956

L. E. IVERSON 2,736,374

GLARE SHIELD

Filed May 31, 1952

INVENTOR

*Lauren E. Iverson*

BY *Robert M. Denning*

ATTORNEY

United States Patent Office 2,736,374
Patented Feb. 28, 1956

2,736,374

GLARE SHIELD

Lauren E. Iverson, St. Paul, Minn.

Application May 31, 1952, Serial No. 291,049

6 Claims. (Cl. 160—220)

This invention relates to an improvement in glare shields and deals particularly with a shield designed for use on an automobile or other vehicle.

Various types of glare shields have been provided for use on automobiles. Some of these shields are secured to the windshield of the vehicle or adjacent thereto so that the driver can shield his eyes from the direct or reflected light rays. The present invention resides in a device of this same general class, but is so constructed that it may be easily mounted in place and may be supported in any of a plurality of positions.

An object of the present invention resides in the provision of a glare shield formed of transparent plastic or similar material which is tinted, coated or constructed to soften the light rays and to reduce glare. This shield is provided with a pair of supporting members which may comprise rubber bands and which are designed to encircle the adjustable visor at present used in most automobiles. The shield is so designed that it may lie substantially flat against the visor when not in use. The elastic bands permit the shield to be supported in any of a plurality of positions projecting from the visor when the shield is in use.

A feature of the present invention resides in the provision of a glare shield having a substantially flat body provided with an angularly extending flange along one edge thereof. This flange is designed to engage flat against the visor when desired to support the shield at substantially right angles to the plane of the visor.

A further feature of the present invention resides in the provision of a glare shield having an angularly extending flange and designed to be supported so that the shield may assume a position at an acute angle to the plane of the visor when desired. As a result the shield may be used as an extension of the visor and be supported in such a manner as to extend downwardly therefrom at an adjusted angle.

A further feature of the present invention resides in the particular manner in which the bands are connected to the visor. In preferred form the bands extend through the visor near the flanged edge thereof. As a result the position of the visor may be shifted at will and will remain in any desired adjusted position.

These and other objects and novel features of my invention will be more clearly and fully set forth in the following specification and claims.

In the drawings forming a part of my invention:

Figure 1:
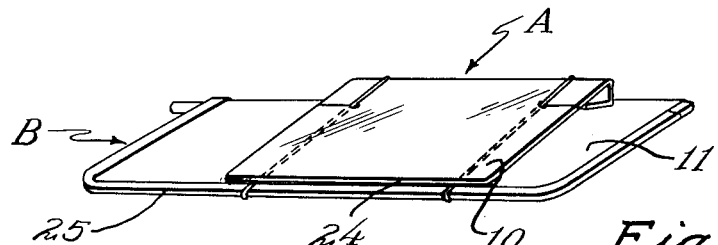
Figure 1 is a perspective view of the visor with the shield in place thereupon.

The glare shield is formed of transparent material and usually is made of tinted sheet plastic or similar material. If desired the shield may comprise a Poloroid material which acts to refract the light rays.

The shield is indicated in general by the letter A and comprises a generally flat body 10 of suitable size and proportions. In preferred form the shield is somewhat shorter in length than the visor B ordinarily found in automobiles and used for cutting off light rays. The visor B is normally made of opaque material and is generally rectangular in form having a flat body 11 which is pivotally supported along one edge upon a bracket arm 12 which is anchored in any suitable manner to the top or the inner body of the car near the top thereof.

The glare shield A includes a flanged edge 13 which extends at substantially right angles to the body 10. Ordinarily the flange 13 is reinforced by a marginal flange 14 which is bent to extend at an acute angle to the flange 14 so as to form a triangular strut reinforcing one edge of the shield. In other words, the flange 14 converges toward the surface of the body 10 and may if desired be secured thereto at a point spaced from the flanged edge.

As indicated in the drawings a pair of spaced apertures 15 and 16 extend through the body 10 near the end of the flange 14. These apertures 15 and 16 are spaced inwardly from the side edges 17 and 19 of the shield body 10 and are of proper size to accommodate a pair of resilient bands 20 and 21. The bands 20 and 21 may be rubber bands or bands of other resilient material capable of stretching and of proper length to encircle the visor 11.

It is desirable that the bands 20 and 21 be of endless form. Accordingly, I prefer to connect the apertures 15 and 16 to the adjacent side edges 17 and 19 respectively with cut lines 22 and 23. By providing these cut lines 22 and 23 the body 10 of the shield may be flexed sufficiently to permit entrance of the bands 20 and 21 into the apertures 15 and 16. After the bands are in place the cut lines 22 and 23 may be sealed by transparent pressure sensitive tape, by a suitable plastic solvent, or by other suitable means. If preferred, and if the shield is of sufficiently heavy plastic, the cuts 22 and 23 may remain in unsealed condition so that the elastic bands may be more easily replaced.

In use the bands 20 and 21 are slipped over the visor 11 to encircle the same. When in this position, portions of the band overlie the reinforced edge of the shield and the resilience of the bands draws the shield against the surface of the visor. It is preferable that the shield be slightly narrower than the visor so that the bands may encircle the shield when the same is not in use without having the edge of the shield project beyond the edges of the visor.

Figure 3:
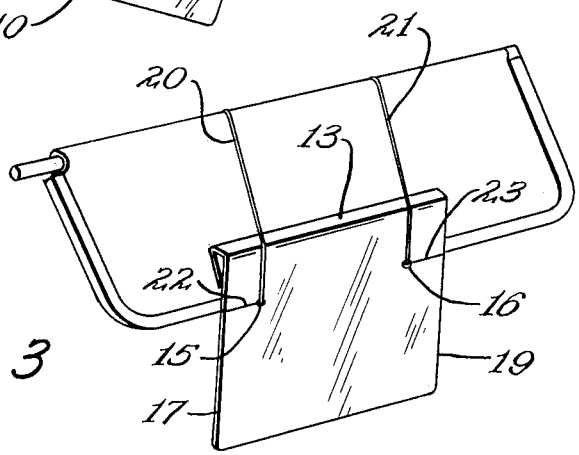
Figure 3 is a view similar to Figures 1 and 2 showing the shield in still another position.
Figure 4:
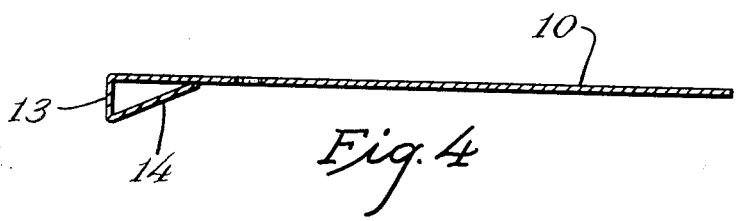
Figure 4 is a sectional view through the visor body.

Figure 1 illustrates the shield in ordinary storage position overlying the upper surface of the visor and thus being positioned between the visor and the top of the vehicle. When the shield is to be used the edge 24 opposite the flanged edge may be grasped and the shield pulled toward the driver until the flange 14 overlies the edge 25 of the visor opposite the hinged edge. In this position, as indicated in Figure 3 of the drawings, the shield body forms an extension of the visor and extends at an acute angle to the plane of the visor. The angle of the visor may then be adjusted so that the shield is in proper position forwardly of the eyes of the driver.

When the shield is used for preventing reflected glare from the hood of the car, the visor may be maintained at a slight angle to a horizontal plane and the visor body will then incline downwardly and rearwardly toward the driver. The elevation of the shield may be adjusted so that the reflected rays will pass through the shield as viewed by the driver. Any desired inclination may be provided by adjusting the angle of the visor itself and by permitting the shield to project beyond the edge of the visor a desired distance.

Figure 2:
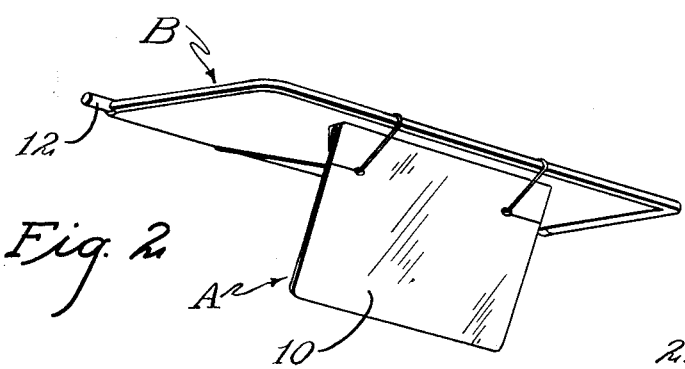
Figure 2 is a view similar to Figure 1 showing the shield in a different position on the visor.

When the shield is used to protect the eyes of the driver from more direct light rays, the shield may be supported on the undersurface of the visor in the manner illustrated in Figure 2. In this position the flange 13 rests against the undersurface of the visor body and the shield body will then extend at substantially right angles to the plane of the visor. As a result, the visor may be supported in its usual horizontal position and the shield will project downwardly a distance sufficient to protect the eyes of the driver.

The ease with which the shield may be produced and the low cost of the shield are of importance, as an efficient shield may be produced and sold for an extremely reasonable cost. The shield may be applied to the visor by anyone without the use of special tools and will not interfere with the normal operation of the visor. The bands permit a practically universal adjustment and a great variety of positions. Thus the shield may be used equally well by drivers of various sizes. Furthermore, because of the ready adjustability of the supporting visor, the shield may be placed at virtually any angle to shield the eyes of the driver regardless of the direction in which the light rays are travelling.

In accordance with the patent statutes, I have described the principles of construction and operation of my glare shield, and while I have endeavored to set forth the best embodiment thereof, I desire to have it understood that obvious changes may be made within the scope of the following claims without departing from the spirit of my invention.

I claim:

1. A plastic glare shield for standing on edge on a sun visor comprising a substantially flat body of transparent material which reduces glare and softens light rays, an integral flanged edge forming a flat side extending substantially at right angles longitudinally along the length of one side of said body of transparent material and forming a stand and support therefor, and a pair of resilient bands for mounting the said glare shield on a sun visor extending transversely of the flat side of said flanged edge and through the body in spaced relation thereabout, whereby when the said bands mount said shield on a sun visor the said flat side of said flanged edge is designed to be held by said pair of resilient bands flush against the sun visor to support the shield at substantially right angles to the plane of the sun visor.

2. The structure described in claim 1 and in which the flanged edge is arranged at substantially right angles to the plane of the body.

3. The structure described in claim 1 and including a second flange connected to the first flange and converging toward the flat body.

4. The structure described in claim 1 and in which the bands extend through the body at a point spaced from, but relatively close to, the flanged edge.

5. A glare shield including a flat body, a flange extending along one edge of said body at substantially right angles thereto, a reinforcing second flange connected to the first flange and converging toward the body to form a substantially triangular strut, said body being of transparent material and having a pair of apertures extending therethrough near opposite edges thereof, the axes of the apertures being on a line parallel with the flanged edge, and a pair of resilient bands extending through said apertures.

6. The structure described in claim 5 and including a pair of slits through said body connecting said apertures with the adjacent edges of the body.

References Cited in the file of this patent
UNITED STATES PATENTS

| | | |
|---|---|---|
| 1,399,673 | Van Amber | Dec. 6, 1921 |
| 1,518,956 | Beitman | Dec. 9, 1924 |
| 2,211,879 | Cave | Aug. 20, 1940 |
| 2,287,581 | Walker | June 23, 1942 |
| 2,317,204 | Lowenthal | Apr. 20, 1943 |
| 2,489,901 | Kocinski | Nov. 29, 1949 |
| 2,528,038 | Crise | Oct. 31, 1950 |
| 2,603,530 | Jones | July 15, 1952 |